(12) United States Patent
Dworatzek et al.

(10) Patent No.: US 7,918,997 B2
(45) Date of Patent: *Apr. 5, 2011

(54) FILTER SYSTEM

(75) Inventors: Klemens Dworatzek, Edingen (DE); Ralf Bauder, Ketsch (DE); Karlheinz Muenkel, Oberderdingen-Flehingen (DE); Duc Cuong Nguyen, Laatzen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 1423 days.

This patent is subject to a terminal disclaimer.

(21) Appl. No.: 11/354,166

(22) Filed: Feb. 15, 2006

(65) Prior Publication Data

US 2007/0039864 A1 Feb. 22, 2007

Related U.S. Application Data

(60) Provisional application No. 60/666,198, filed on Mar. 30, 2005.

(30) Foreign Application Priority Data

Feb. 15, 2005 (DE) .......................... 10 2005 007 021

(51) Int. Cl.
*B01D 35/30* (2006.01)
*B01D 27/00* (2006.01)
(52) U.S. Cl. ....................................... 210/232; 210/443
(58) Field of Classification Search .................. None
See application file for complete search history.

(56) References Cited

U.S. PATENT DOCUMENTS

| | | | | |
|---|---|---|---|---|
| 4,678,572 | A * | 7/1987 | Hehl | 210/232 |
| 6,139,738 | A | 10/2000 | Maxwell | |
| 6,177,003 | B1 | 1/2001 | Jainek et al. | |
| 6,481,580 | B1 | 11/2002 | Amstutz et al. | |
| 2002/0043506 | A1 | 4/2002 | Amstutz et al. | |
| 2003/0019809 | A1 | 1/2003 | Amstutz et al. | |
| 2003/0024870 | A1 | 2/2003 | Reinhart | |
| 2004/0112348 | A1* | 6/2004 | Dworatzek et al. | 123/572 |

FOREIGN PATENT DOCUMENTS

| | | |
|---|---|---|
| DE | 2628448 | 1/1977 |
| DE | 3027994 | 2/1982 |
| DE | 196 44 646 A1 | 4/1998 |
| DE | 19644647 | 4/1998 |
| DE | 69704315 | 8/2001 |
| DE | 10023427 | 11/2001 |
| EP | 1 281 426 A1 | 2/2003 |
| WO | WO 2005/005014 A1 | 1/2005 |

OTHER PUBLICATIONS

German Patent Office search report for DE 10 2005 007 021.3.
European Search Report dated May 15, 2006 including English Translation of relevant portion (Nine (9) pages).

* cited by examiner

*Primary Examiner* — Krishnan S Menon
*Assistant Examiner* — Allison Gionta

(57) ABSTRACT

A filter system for a fluid having a cup-shaped housing releasably connected to a connecting head and a filter element arranged in the housing, in which the releasable connection is formed by at least one connecting element formed on the connecting head which engages a connecting element formed by a part of the filter element in combination with a part of the cup-shaped housing such that the connection between the housing and the receiving head can only be produced if a proper filter element is installed in the housing.

12 Claims, 7 Drawing Sheets

FILTER SYSTEM

BACKGROUND OF THE INVENTION

The present invention relates to a filter system comprising a cup-shaped housing releasably connected to a connecting head or receiving head and a filter element arranged in the housing. The invention additionally relates to a connecting head for a filter system of the aforementioned type, to a cup-shaped housing for a filter system of the aforementioned type, to a filter element for a filter system of the aforementioned type, and to a method of servicing a filter system of the aforementioned type.

A liquid filter of this type is known, for example, from U.S. Pat. No. 5,888,384 (=DE 196 44 647). This filter has a connecting head whose installation opening for the filter cartridge points downward and into which a cup-shaped housing can be screwed after installing the filter element. The inlet and outlet for the filter and/or the filter system are located in the connecting head, i.e., in the upper part of the filter system.

A potential problem with this filter system is that the connecting head and the cup-shaped housing can be joined together without inserting a filter element, or even if the wrong filter element, i.e., one not intended for this system, is inserted. As a countermeasure to prevent such errors, prior art filter elements have been constructed with different shapes so that the possibility of a mix-up can be ruled out as much as possible. However, such measures will not necessarily prevent the absence of a filter element from going unnoticed.

Furthermore, there are other applications in which the filter elements differ with regard to details such as different filter media, but the dimensions and geometries remain substantially identical. Here again, there is a potential problem of installing the wrong filter element in the filter system, which can result in major damage in the fluid circuit.

SUMMARY OF THE INVENTION

It is therefore an object of the invention to provide an improved fluid filter comprising a cup-shaped housing detachably connected to a connecting head and a filter element arranged in the housing.

Another object of the invention is to provide a filter system which will eliminate the possibility of forgetting to install a filter element or of installing the wrong filter element.

A further object of the invention is to provide a filter system which is easy and inexpensive to manufacture.

It is also an object of the invention to provide a method carrying out maintenance of such a filter system.

These and other objects are achieved in accordance with the present invention by providing a fluid filter system comprising a cup-shaped housing connected to a receiving head by a releasable connection, and a filter element arranged in the housing between a fluid inlet and a fluid outlet, wherein one connecting element of the releasable connection is provided on the receiving head, and a part of the filter element and a part of the cup-shaped housing together form another connecting element of the releasable connection such that the connection between the housing and the receiving head can only be established when a filter element is properly installed in the housing.

In accordance with a further aspect of the invention, the objects are achieved by providing a connecting head for a filter system comprising a cup-shaped housing connected to the connecting head by a releasable connection, and a filter element arranged in the housing, wherein the connecting head is provided with at least one connecting element for engaging a connecting element on the housing to form the releasable connection, and the connecting element further comprises a blocking element for preventing establishment of the releasable connection between the housing and the receiving head when no filter element or an incorrect filter element is installed in the housing.

The objects of the invention are also achieved by providing a housing for a filter system comprising the housing connected to a connecting head by a releasable connection, and a filter element arranged in the housing, wherein the housing has an essentially cylindrical construction with one axial end being closed and the other axial end being open, and at least one connecting element part for the releasable connection to the connecting head is arranged on the housing adjacent the open axial end, the at least one connecting element part comprising a recess for receiving a connecting element part of the filter element when the filter element is properly installed in the housing, whereby the connecting element part of the housing and the connecting element part of the filter element together form an operative connecting element for releasably connecting the housing to the connecting head.

In yet another aspect, the objects of the invention are achieved by providing a method for maintaining a filter system comprising a cup-shaped housing connected to a receiving head by a releasable connection, and a filter element arranged in the housing, comprising assembling the filter element to the cup-shaped housing by inserting the filter element into the housing with a connecting element part of the filter element received in a recess of the cup-shaped housing, and releasably attaching the assembled cup-shaped housing and filter element to the receiving head via connecting elements formed by the combination of the connecting element parts of the filter element and connecting element parts of the cup-shaped housing.

The fluid filter system according to the invention comprises a cup-shaped housing, a filter element detachably arranged therein and a receiving head. The filter system is preferably designed for filtering liquids, but it may also be used for filtering gaseous fluids. The filter system is especially suitable for filtering oil, fuel or liquid coolant for an internal combustion engine. The receiving head may be a separate part which is flange-mounted on the engine block of an internal combustion engine, for example, but it is also possible to design the receiving head directly as part of the engine block. The filter element is removably installed in the cup-shaped housing, and the cup-shaped housing is connected to the receiving head by a releasable connection. The releasable connection comprises at least two functional members, with one functional member being arranged in the receiving head and the other functional member being formed by a combination of an integral part of the filter element and the cup-shaped housing. This means that the connection of the housing to the receiving head is only possible through the combination of the cup-shaped housing with a filter element installed therein. The filter element thus becomes an indispensable component of the closure.

The cup-shaped housing may be constructed as a plastic or metal part, and the filter element is preferably a hollow cylindrical filter element with zigzag pleated filter bellows arranged therein. However, it is also possible to use a substantially cylindrical filter element through which fluid flows from axial end face to axial end face. This ensures that only the correct filter element can be used in each case. This desirable result is achieved by the fact that a part of the filter element, which together with a part of the cup-shaped housing forms the integral second functional member of the connection, has active contours corresponding to receiving contours of the cup-shaped housing. Another advantage here is that inadvertent or unintentional omission of the filter element during maintenance prevents the connection from being closed.

In accordance with one advantageous embodiment of the present invention, the releasable connection is a bayonet connection. Some of the connecting elements are formed in the connecting head, and the remaining connecting elements are formed by the combination of the filter element and the cup-shaped housing. To this end, the filter element is inserted into the cup-shaped housing, and the resulting assembly is joined to the connecting head by the bayonet connector principle. In the absence of a filter element or when the wrong filter element has been installed, the bayonet connection cannot be closed.

It is advantageous if a part of the cup-shaped housing and a part of the filter element at least partially engage each other and thus form a continuous connecting element surface. The cup-shaped housing preferably forms part of a catch element surface with a recess formed therein, and a part of the filter element engages in this recess and thus completes the catch element surface which is necessary for establishing the bayonet connection with the receiving head. The catch element surfaces are preferably distributed around the outer circumference adjacent the open axial end of the cup-shaped housing, so the active contours of the filter element which engage in the recess in the catch element surfaces are then also distributed around the circumference in an equidistant arrangement. This is therefore a simple method of achieving the result that only the filter element intended for this specific application can be installed in the filter system.

According to an alternative embodiment of the filter system, the connecting element for establishing a releasable connection is a clip connection implemented by hooks, snap hooks or catch cams, for example. Clip noses here engage in corresponding receptacles on the receiving head, starting from the cup-shaped housing in combination with the filter element. Here again, the clip noses are formed by a combination of the cup-shaped housing with the corresponding filter element. A detachable connection between the cup-shaped housing and the receiving head can be established only when the corresponding filter element has been inserted.

It is again advantageous that a part of the cup-shaped housing and a part of the filter element engage at least partially in one another to form a continuous catch nose contour. At least two catch noses extending axially away from the housing are preferably arranged on the axial open end of the cup-shaped housing, these catch noses in turn having recesses arranged on the edge or in the interior of the catch nose contour into which a part of the properly fitting filter element then engages. This part of the corresponding filter element in turn completes the catch nose contour so that when the filter element is properly inserted, a detachable connection is possible via a catch connection with the receiving head.

In accordance with one specific embodiment of the invention, a blocking element for preventing establishment of the releasable connection is provided in the connecting head to prevent the connection between the cup-shaped housing and connecting head. This blocking element may be, for example a spring-mounted pin or, for example, a movable nose, but in any case it should be a contour which prevents the connection of the parts to one another in a form-fitting manner if the filter element is absent or is not the right filter element for the filter system. The blocking element is then engaged in the recess in the connecting element of the cup-shaped housing part, the recess not being closed at that point, by means of spring force when closing the connection, for example, or when the filter element is absent or the wrong filter element has been inserted and it thus prevents further rotation or further axial insertion of the cup-shaped housing part into the connecting head.

The connecting head for a filter system of the type defined above has contours forming the second part of the connecting element for establishing the releasable connection between the cup-shaped housing in combination with the filter element and the connecting head. Furthermore, the fluid inlet and outlet lines are integrated into the connecting head. The connecting head preferably has a cup-shaped recess, where the contours forming the second part of the connection element for establishing the releasable connection are distributed over the circumference of the axial wall of the recess. The fluid outlet is preferably arranged concentrically at the midpoint of the cup-shaped recess and the connecting head and the fluid inlet is arranged concentrically around the fluid outlet but still within the cup-shaped recess.

According to an advantageous embodiment of the connecting head, it has the arrangement described above for blocking the connection with the cup-shaped housing. As already stated, the blocking element may be comprise a movable pin or a movable nose which is movably mounted in the connecting head. When inserting the cup-shaped housing in combination with a filter element which fits it, the blocking element is moved into a connecting position by the connecting element of the cup-shaped housing and of the filter element. In this connecting position, a problem-free detachable connection can be achieved between the connecting head and the cup-shaped housing, including the filter element that fits in it.

The housing according to the invention for the filter system described above is designed to be essentially cylindrical, with one end being closed and one end being open, like a beaker without a handle. In the area of the open end, parts of a connecting element are situated for establishing a releasable connection with a receiving head, where the connection element parts for establishing the releasable connection include recesses such that the connecting element can be completed by installation of a proper filter element.

According to another embodiment of the cup-shaped housing, the connection elements for establishing a releasable connection are distributed around the outer circumference and arranged on the open end of the cup-shaped housing. In addition to the recesses in the connection elements, recesses are also provided in the housing, extending from the open edge at the end at least as far as the connection elements. This means that slot-shaped or groove-shaped recesses are provided in the lateral surface of the cylindrical part of the cup-shaped housing, starting from the open end, the filter element being insertable into these recesses via the parts of the connection elements provided on a part of the filter element, thus completing a part of the lateral surface and a part of the connection elements of the cup-shaped housing.

The filter element of the invention for the filter system defined above is constructed in the form of a hollow cylinder and in the area of one of the end faces it has at least one active contour or connecting element part extending radially outward beyond the diameter on the circumference. This connecting element part cooperates with the recesses in the cup-shaped housing, so that the connecting element part of the filter element can be inserted into the recesses in the cup-shaped housing and also completes the releasable connecting element of the cup-shaped housing.

The filter element of the invention comprises a filter medium through which the liquid flows axially or radially through zigzag pleats, coils or alternately closed channels. The medium may be a synthetic filter medium or a filter paper and one or more filter bellows may be situated in the filter element. Furthermore, the filter element may have a closed fluid-tight sheathing or canister or it may be have an open construction.

The side of the filter element opposite the connecting head may have a closed end disk and the end facing the connecting head preferably has an open ring-shaped end disk. The end disks may be made of synthetic resin material (i.e., plastic) or a nitrile rubber, for example. Furthermore, it is possible to protect the filter medium from collapsing due to pulsation by including a support tube, which is arranged in the interior of the hollow cylindrical filter medium or on the outside around the hollow cylindrical filter medium. In the area of the connection with the connecting head, it is also advantageous to provide a return flow barrier in the form of a membrane and/or a valve, e.g., to protect against running empty when the internal combustion engine is not running.

The connecting element part of the filter element, which corresponds to the cup-shaped housing, is preferably arranged on the connecting end of the filter element and may be constructed as part of a support tube, for example, of which the end disk is formed or it may also be constructed as part of whatever sheathing is provided for the filter element.

It is advantageous here if the filter element connecting element part is designed to correspond directly to a recess in the cup-shaped housing, where the connecting element part also supplements a part of a connecting element on the cup-shaped housing for releasably connecting the housing to a connecting or receiving head. This ensures that only a filter element specifically designed for the filter system can be inserted into the cup-shaped housing, and furthermore that the cup-shaped housing can be connected to the connecting head only together with this filter element which is intended for use here. The connecting element of the filter element also fills up a recess within the connecting element of the cup-shaped housing and supplements it to yield a complete and operative connecting element.

It is thus clear that each part of the filter system makes its own technical contribution to the overall filter system. Only the combination of the filter element that is provided and a properly fitting cup-shaped housing can be detachably and sealingly locked in the connecting head.

For maintenance and servicing, it is always important, first, for a filter element to be used at all and, secondly, for the correct filter element for the filter system and for the application to be used. Therefore, the filter element with its radially outwardly extending connecting element parts is inserted into the corresponding recesses in the cup-shaped housing, so the connecting element parts of the filter element combine with the mating contours of the cup-shaped housing to form a part of the connecting elements for forming a releasable connection between the receiving head, the cup-shaped housing and the filter element. In this way, the combination of the cup-shaped housing and the filter element can then be inserted into the receiving head and detachably connected to the latter. Only through a correct connection of the filter element and the cup-shaped housing is it possible to close the connection.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be describe in further detail hereinafter with reference to illustrative preferred embodiments shown in the accompanying drawing figures, in which.

DETAILED DESCRIPTION OF PREFERRED EMBODIMENTS

Figure 1:
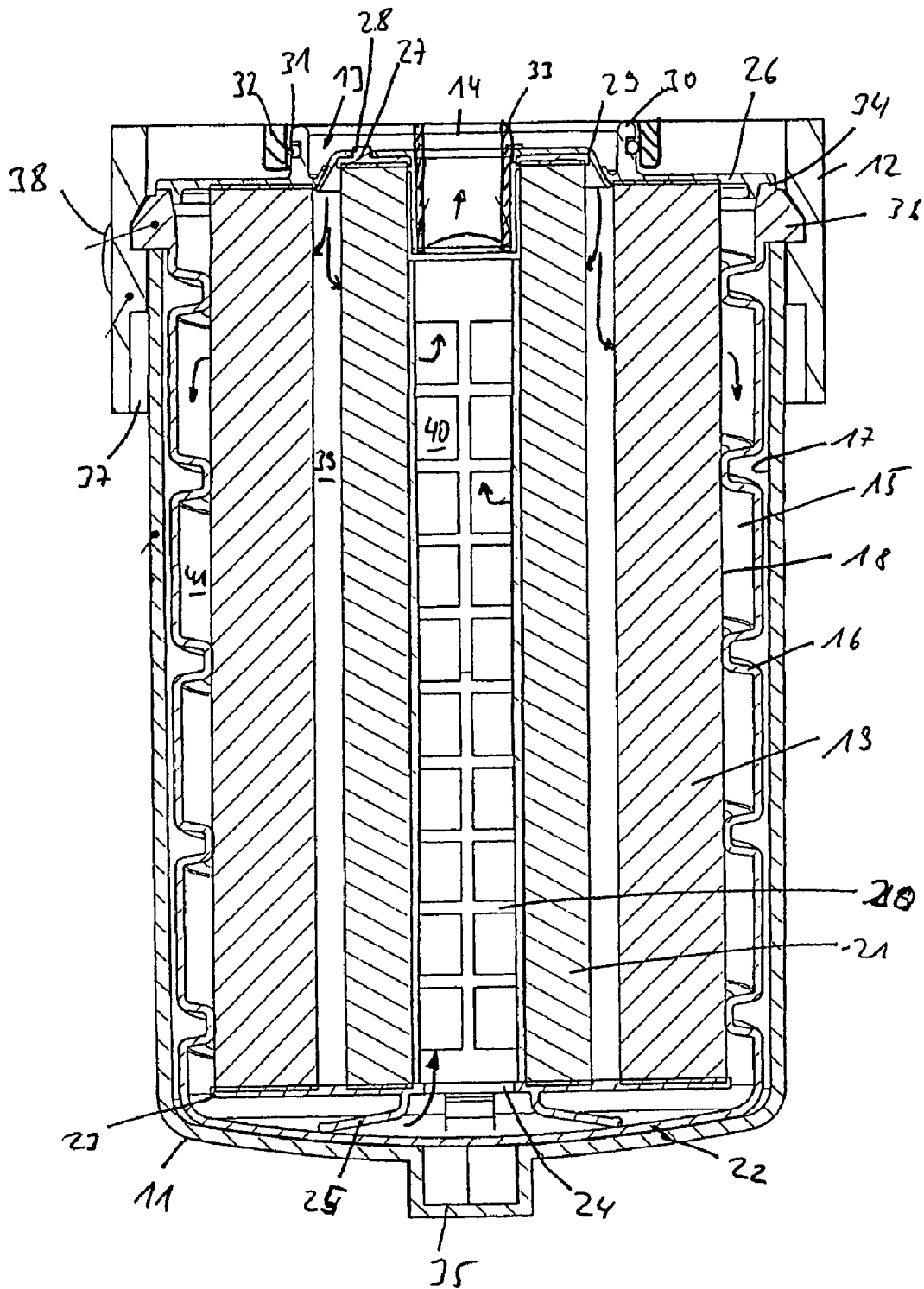
FIG. 1 is a sectional diagram of a fluid system according to the present invention.

FIG. 1 is a sectional diagram of a fluid filter system 10 according to the invention in which a cup-shaped housing 11 is connected by a bayonet connection to a connecting head 12. The connecting head may be a separate connecting flange or it may be formed directly from a part of an internal combustion engine. The filter system may be used for any type of fluids associated with operation of an internal combustion engine, e.g., oils, fuels, hydraulic fluids or coolants. An inlet 13 and an outlet 14 are provided in the connecting head 12 of the filter system 10. In the illustrated embodiment, the outlet 14 is arranged concentrically at the center of the connection between the cup-shaped housing 11 and the connecting head 12, and the inlet 13 is arranged concentrically around the outlet 14, likewise in the interior of the connection between the cup-shaped housing 11 and the connecting head 12, but other arrangements are possible.

A filter element 15 is provided in the cup-shaped housing 11. Filter element 15 comprises a canister 16 to hold the filter medium or media. The radially outer periphery of canister 16 is supported against an inside wall 17 of the cup-shaped housing 11. Simultaneously, radially inwardly extending grooves formed in the wall of canister 16 support an outside wall 18 of a first filter bellows 19 arranged in the canister. The canister 16 is fluid-tight and also functions as an outer support tube for the first filter bellows and provides support with respect to pressure pulsations against the cup-shaped housing 11. The canister 16 may therefore be constructed with a relatively small material thickness because it is actually protected from pressure pulsation by being supported against the cup-shaped housing 11.

A support tube 20 is arranged concentrically in the interior of the filter element and a second filter bellows 21 extends around the support tube. The first and second filter bellows may be formed by a filter medium having zigzag pleating, a coiled filter medium, a combination of the two, or any other type of filter bellows known in the art.

At the bottom 22 of the canister 16, the two filter bellows are held by an end disk 23 constructed in the form of a circular ring with a concentric opening 24. A spring element 25 is formed in one piece with the end disk 23, which supports the filter bellows against the housing bottom 22 and axially positions and fixes the filter bellows by applying an axially upwardly acting spring force. The radial positioning and fixation are accomplished by the inside contour of the canister 16.

At the opposite end of the filter bellows, the first filter bellows 19 have an end disk seal 26. The second filter bellows 21, which is arranged in the interior of the first filter bellows 19, has a slightly greater axial length than the first filter bellows 19. The end closure of the second filter bellows 21 is achieved by a circular end disk 27 which forms a concentric passage for the outlet 14.

End disk 27 has a securing element 28 for a barrier membrane 29 extending axially in the direction of the connecting head 12. The securing element 28 is distributed around the end disk 27 and comprises a plurality of pins or mushroom-shaped contours extending axially toward the connecting head 12. The barrier membrane 29 is attached securely to the end disk 27 by the securing element 28, and thereby seals the fluid inlet 13 when the internal combustion engine is not running and also closes off the fluid outlet 14 to prevent leakage when the filter element is removed for the purpose of maintenance. The barrier membrane 29 is preferably made of a soft thermoplastic material such as a thermoplastic elastomer (TPE).

End disk 26 has an axially extending, concentric annular collar 30 with a groove arranged on its outer circumference to receive a sealing ring 31. The annular collar 30 is inserted into a collar receptacle 32 on the connecting head when the cup-shaped housing 11 and receiving head 12 are connected, with the sealing ring 31 providing a seal between the annular collar 30 and the collar receptacle 32. An outlet tube 33 is arranged concentrically in the interior of the collar receptacle 32 and when inserted into the opening of the end disk 27 opens the return flow barrier of the barrier membrane 29 on the outlet side.

To provide a seal between the unfiltered fluid side of the filter element and the filtered fluid side, a seal is effected radially between the barrier membrane 29 and the outlet tube 33 which is arranged in the connecting head 12. To achieve a fluid-tight seal of the filter element 15, the canister 16 and the end disk 26 are permanently joined to each other in a sealed manner via a connecting contour 34, e.g., by a welding method or an adhesive bonding method.

To facilitate opening of the cup-shaped housing 11 for the purpose of maintenance and subsequent re-connection of the housing to the receiving head 12, the housing is providing with a tool engaging member 35, which may comprise a hexagonal socket or a hexagonal protrusion. To perform maintenance, a tool is engaged here to separate the cup-shaped housing 11 from the connecting head 12 or to reattach the two parts.

At one axial end of the canister 16, a plurality of connecting element parts 36 are constructed in the form of radially outwardly extending noses distributed around the circumference of the canister. These connecting element parts 36 engage in recesses in the cup-shaped housing 11, which are shown in greater detail in the following figures. The connecting element parts 36 of the canister 16 simultaneously function as connecting contours 34 for the connection of the canister 16 to the end disk 26.

Figure 7:
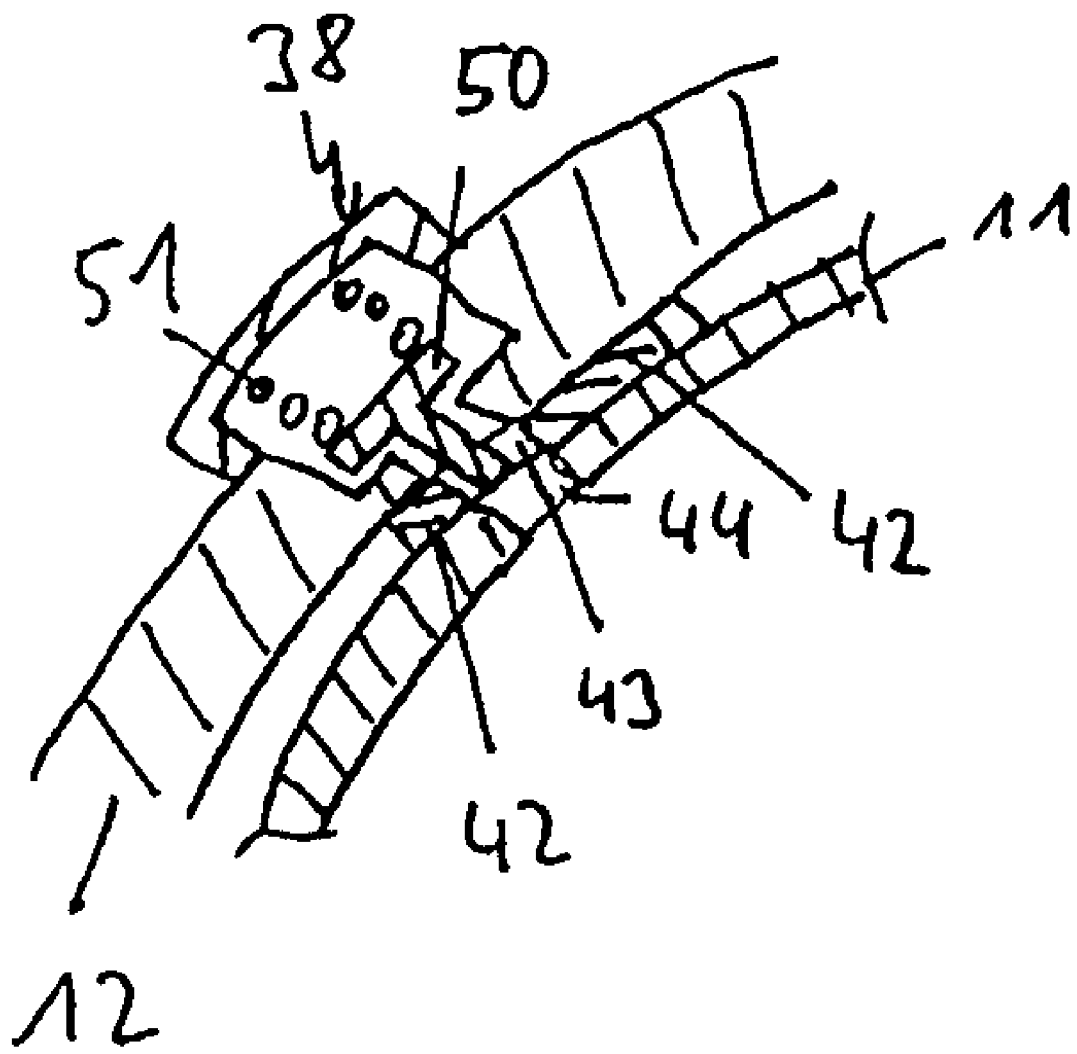
FIG. 7 is a top sectional view showing the area of the blocking element.

The connecting head 12 has guides 37 in which the connecting elements formed from the connecting element parts 36 of the canister 16 and the connecting elements 42 of the cup-shaped housing 11, can be inserted and guided. At least one blocking element 38 is provided in the outer area of the connecting head 12 to prevent a connection between the cup-shaped housing and the connecting head 12 when no filter element 15 is installed or when the wrong filter element has been installed. If the recess 44 in the connecting element 42 on cup-shaped housing 11 is not filled by a canister connecting element part 36, then the blocking element 38 can engage in the recess 44 and thus prevent rotation of the housing and closure of the bayonet connection. FIG. 7 shows the function of the blocking element 38.

The fluid to be filtered flows through the inlet 13 of the connecting head 12 into an intermediate space 39 between the two filter bellows 19 and 21. The fluid then can flow through the inner, second filter bellows 21 into a discharge chamber 40 on the clean side within the support tube 20, and afterward can flow back through the barrier membrane 29 opened by the outlet tube 33 through the outlet 14 on the clean side back into the system. Another portion of unfiltered fluid from intermediate space 39 can flow radially outwardly through the outer, first filter bellows 19 into a volume adjacent the canister wall, from whence it flows downward to the housing bottom 22 and from there can be returned back to the system through the outlet 14 on the clean side.

Figure 2:
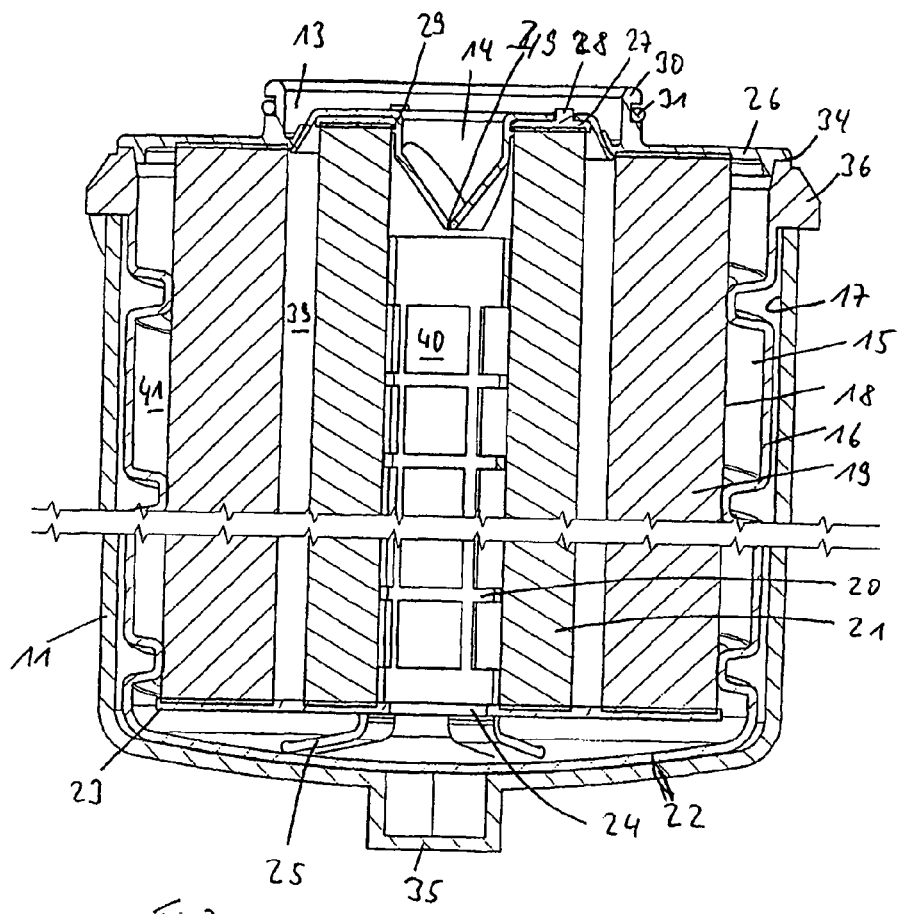
FIG. 2 is a sectional view through the filter element and the cup-shaped housing.
Figure 3:
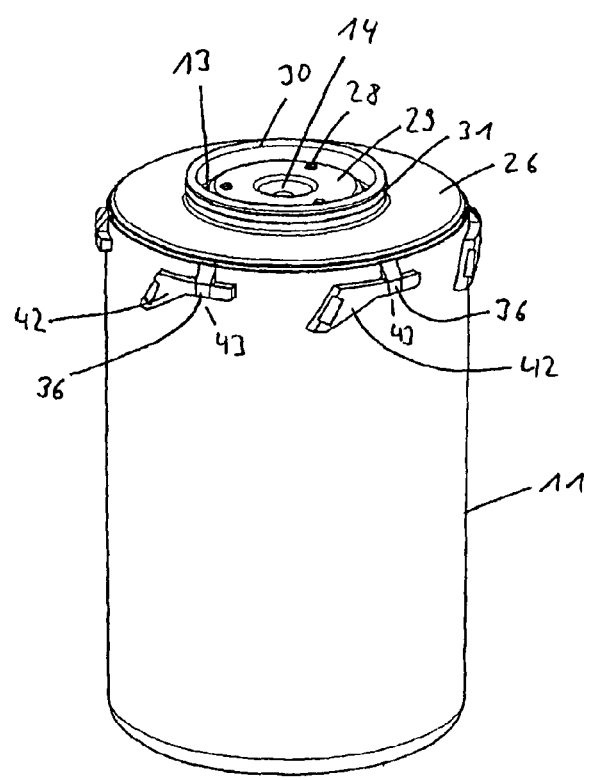
FIG. 3 is a perspective view of the filter element and the cup-shaped housing.

FIG. 2 is a sectional view showing the combination of filter element 15 and cup-shaped housing 11. Components corresponding to those in the previous figure are identified by the same reference numerals. This figure shows that when the cup-shaped housing 11 including the filter element 15 is detached from the connecting head 12, the barrier membrane 29 reverts back to its original shape in the area of the outlet 14 on the clean side due to the removal of the outlet tube 33, and discharge of fluid present in the filter element 15 is thereby prevented. By constructing the barrier membrane 29 of a thermoplastic elastomer, a restoring force can be induced within the barrier membrane due to its contour, which is manifested by the sealing closure of the outlet which is tightly closed solely by the restoring force of the barrier membrane 29.

Figure is a perspective view of the cup-shaped housing 11 with the filter element 15 arranged in it. Again, components corresponding to the previous figures are identified by the same reference numerals. The multiple connecting elements 28 of end disk 27 for the barrier membrane 29 can be seen clearly here. In addition, a plurality of connecting elements 42 for producing the bayonet connection in the filter system 10 are arranged uniformly distributed around the periphery of the open axial end of the cup-shaped housing 11. When filter element 15 is correctly installed, the connecting element parts 36 of the filter element are received in the recesses 43 in the connecting elements 42, thereby completing the connecting elements 42. When a filter element 15 is not installed or a filter element that has been installed does not fit properly, the recess 43 in the connecting element 42 remains free, and the blocking element 38 engages in the recess 43 and stops rotation of the cup-shaped housing 11 relative to the connecting head 12, thereby preventing a bayonet-type connection from being formed between the cup-shaped housing 11 and the connecting head 12.

Figure 4:
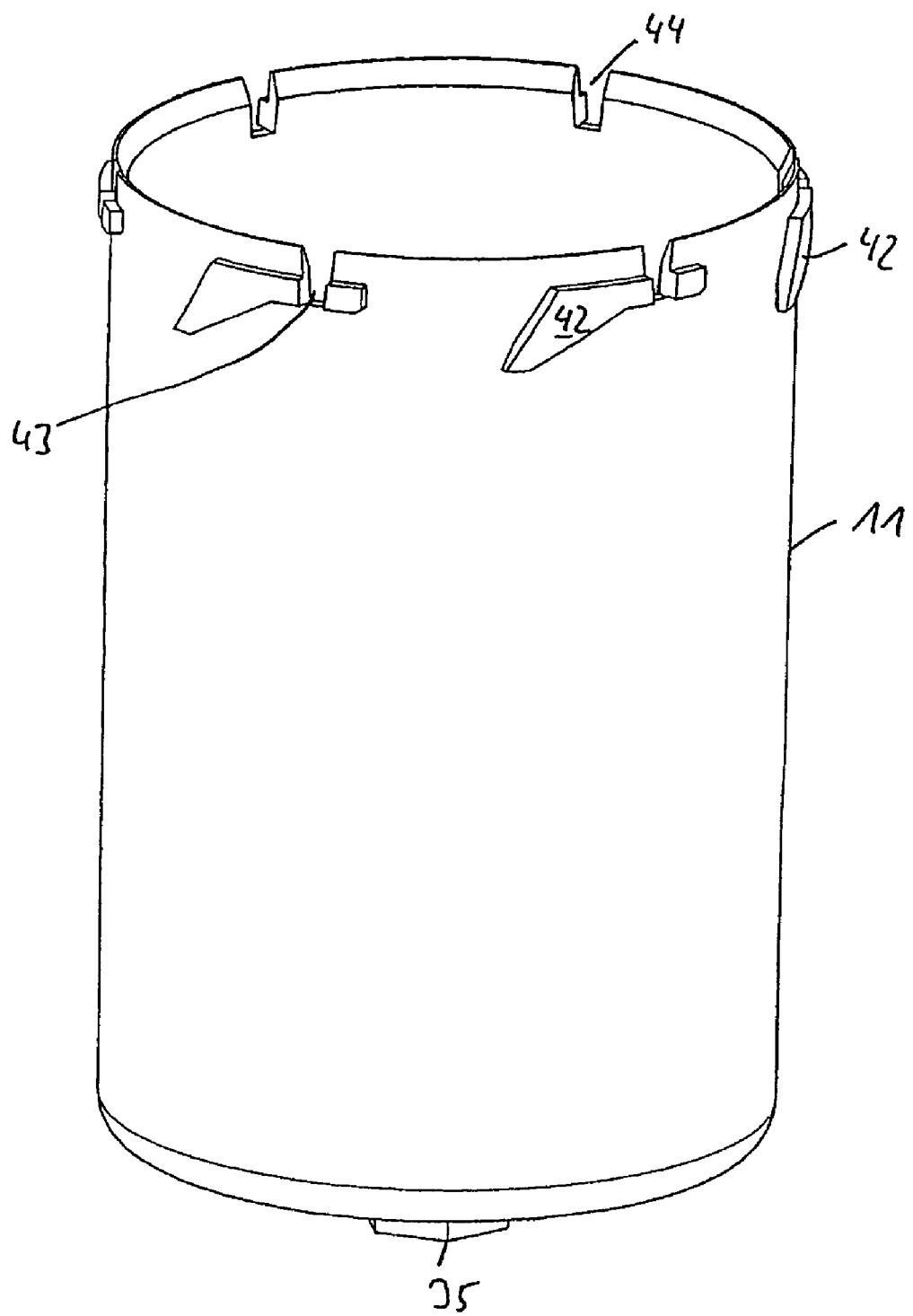
FIG. 4 is an individual perspective view of the cup-shaped housing.

FIG. 4 is a perspective view of the cup-shaped housing 11. The cup-shaped housing 11 has recesses 44 distributed around the circumference and extending axially from the open end of the cup-shaped housing 11 for insertion of the filter element 15 and ending in the recesses 43 in the connecting elements 42. The connecting element parts 36 on the filter element 15 are inserted into the recesses 44 to the end of the recesses 43, thereby completing the connecting elements 42. Only in this way are the surfaces of the connecting elements 42 completed to enable the cup-shaped housing 11 to be connected to the connecting head 12.

Figure 5:
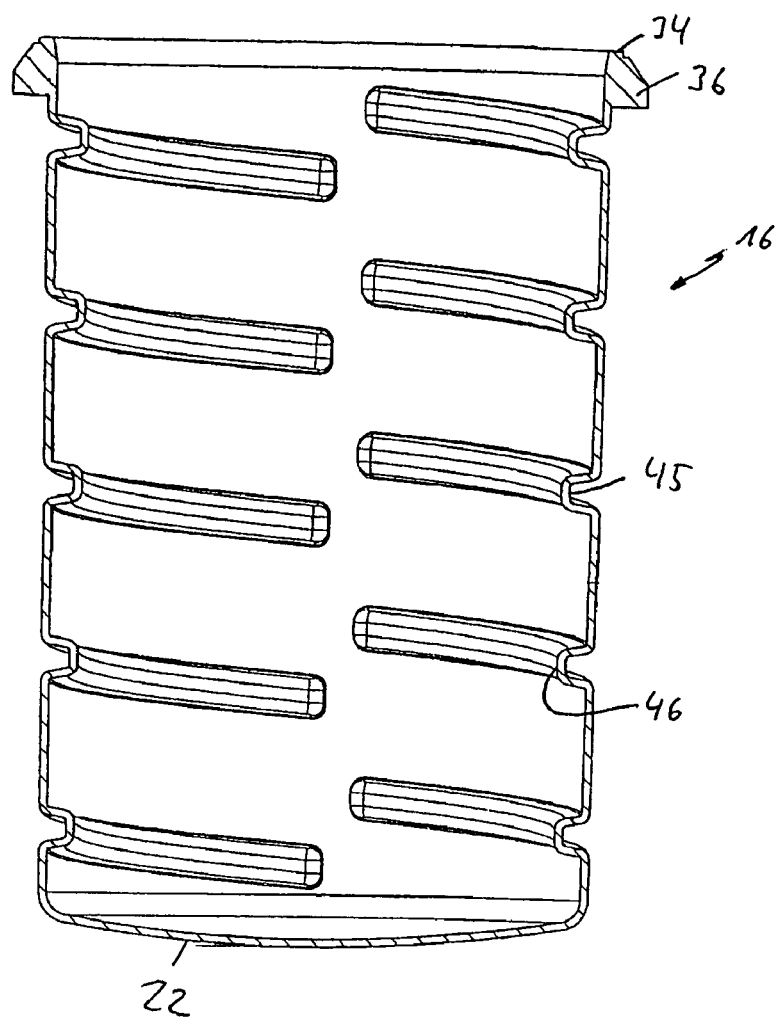
FIG. 5 is a sectional view through the outer shell of the filter element.

FIG. 5 shows a section through the canister 16, which forms the outside shell of the filter element 15. A plurality of grooves 45 are distributed across the lateral surface of the canister 16, forming a contact surface 46 for the first filter bellows 19 in the interior of the canister 16. Since the grooves 45 are not formed continuously around the inside circumference of the canister 16, this yields a simple possibility for passing the fluid, which is cleaned as it flows through the first filter bellows 19, via the housing (i.e., the canister bottom 22) to the discharge chamber 40 on the clean side. Then the remainder of the filter element described above is inserted into the canister 16 and connected to the canister 16 at the connecting contour 34. This results in a fluid-tight system which, whenever maintenance is required, prevents contamination of the environment and the surroundings as well as preventing soiling of the hands of the maintenance personnel. The axial closure of the canister 16 in the area of the open end is in turn formed by the parts 36 of the catch elements which engage in the recess 43 of the catch contour 42 of the cup-shaped housing 11.

Figure 6:
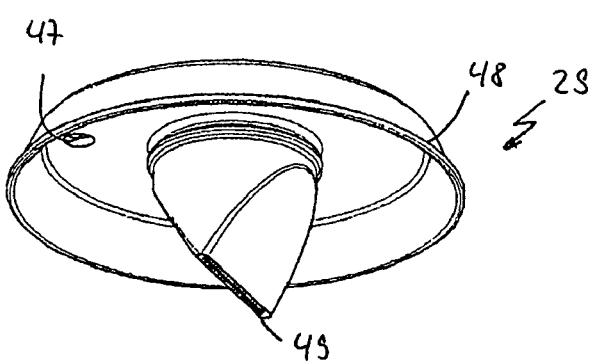
FIG. 6 is a perspective view of the barrier membrane.

FIG. 6 is a perspective view of the barrier membrane 29. Again, components corresponding to the previous figures are identified by the same reference numerals. The barrier membrane is constructed essentially in the form of a sheet, preferably of a thermoplastic elastomer, and has a plurality of openings 47 in the sheet-like part to establish the connection with the end disk 27 via the connecting elements 28. The outer area of the barrier membrane 29 has a sealing surface 48, which is angled in relation to the sheet-like area, for sealing the inlet area of the filter system 10. Due to the flexibility of the material, the sealing surface 48 is lifted off the mating sealing surface of the end closure disk 26 when the fluid to be cleaned flows in, thereby ensuring an influx of fluid. When the internal combustion engine is not running, i.e., when no liquid pressure is applied to the barrier membrane, the elasticity of the barrier membrane causes the sealing surface 48 to spring back into contact with the sealing surface of the end closure disk 26, thereby closing the inlet 13.

Concentrically in the interior of the barrier membrane 29, a type of sealing valve 49 is provided for closing the outlet when the filter element is removed from the fluid circuit. The outlet seal 49 comprises a type of duckbill, which in the installed state, is opened by the outlet tube 33 from the connecting head 12. Upon removal of the outlet tube 33, the outlet seal 49 closes again due to its inherent elasticity. Thus both the barrier membrane and the non-return valve are realized by a single, integral or one-piece component.

FIG. 7 depicts one possibility of using the blocking element 38. Again, components corresponding to those in the previous figures are identified by the same reference numerals. FIG. 7 shows a top view of a section of the receiving head 12 and cup-shaped housing 11 in the area of the blocking element 38. The blocking element 38 comprises a locking pin 50 and a spring 51 arranged on the connecting head 12 so that the locking pin 50 is movable axially against the force of the spring 51. If a filter element 15 is not present when the cup-shaped housing 11 and the connecting head 12 are brought together, then the locking pin 50 engages in the recess 43 of the connecting element 42 due to the force of the spring 51, thereby preventing rotation of the housing in relation to the connecting head in order to establish the bayonet connection. If a filter element 15 is correctly installed, the recesses 43 and 44 are filled by the connecting element parts 36 of the filter element 15, thereby completing the surface of connecting element 42, so that locking pin 50 is pushed back against the force of spring 51 into the connecting head 12 and it is possible for the cup-shaped housing 11 to be rotated in relation to the connecting head 12, thus allowing a bayonet connection to be established.

Figure 8:
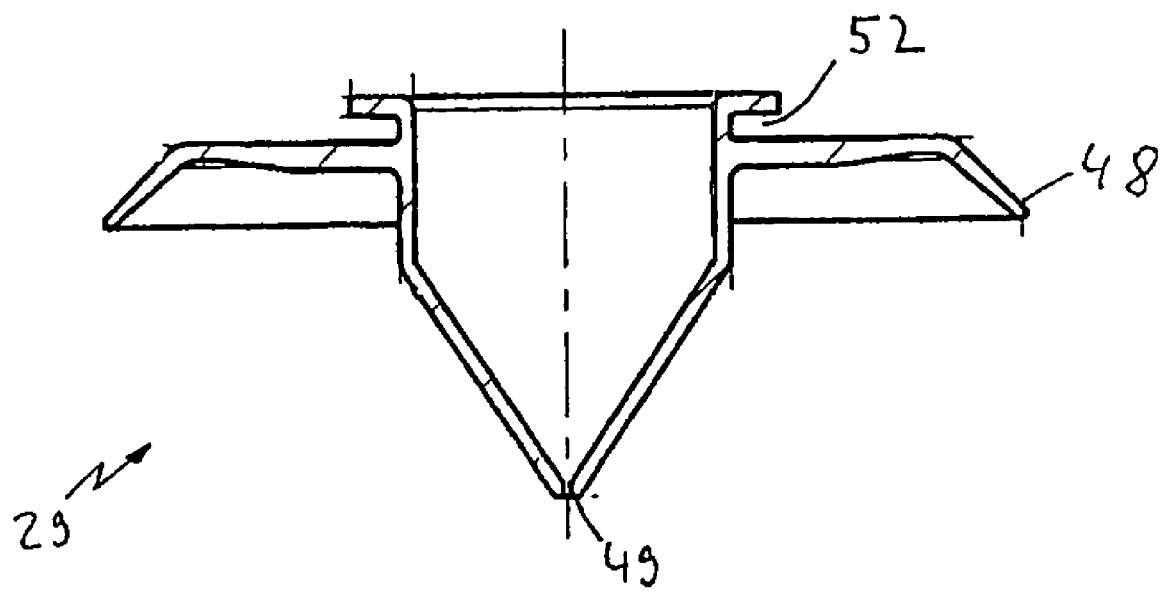
FIG. 8 is a sectional view through an alternative barrier membrane.

FIG. 8 shows a section through an alternative embodiment of barrier membrane 29. Again, components corresponding to those in the preceding figures are identified by the same reference numerals. Attachment of the barrier membrane 29 to the filter element 15 is achieved here via an annular peripheral groove 52 arranged concentrically with the inlet sealing surface 48. The annular groove 52 serves to receive an end disk (not shown here). The connection between this alternate barrier membrane embodiment and the end disk is illustrated in FIG. 9.

Figure 9:
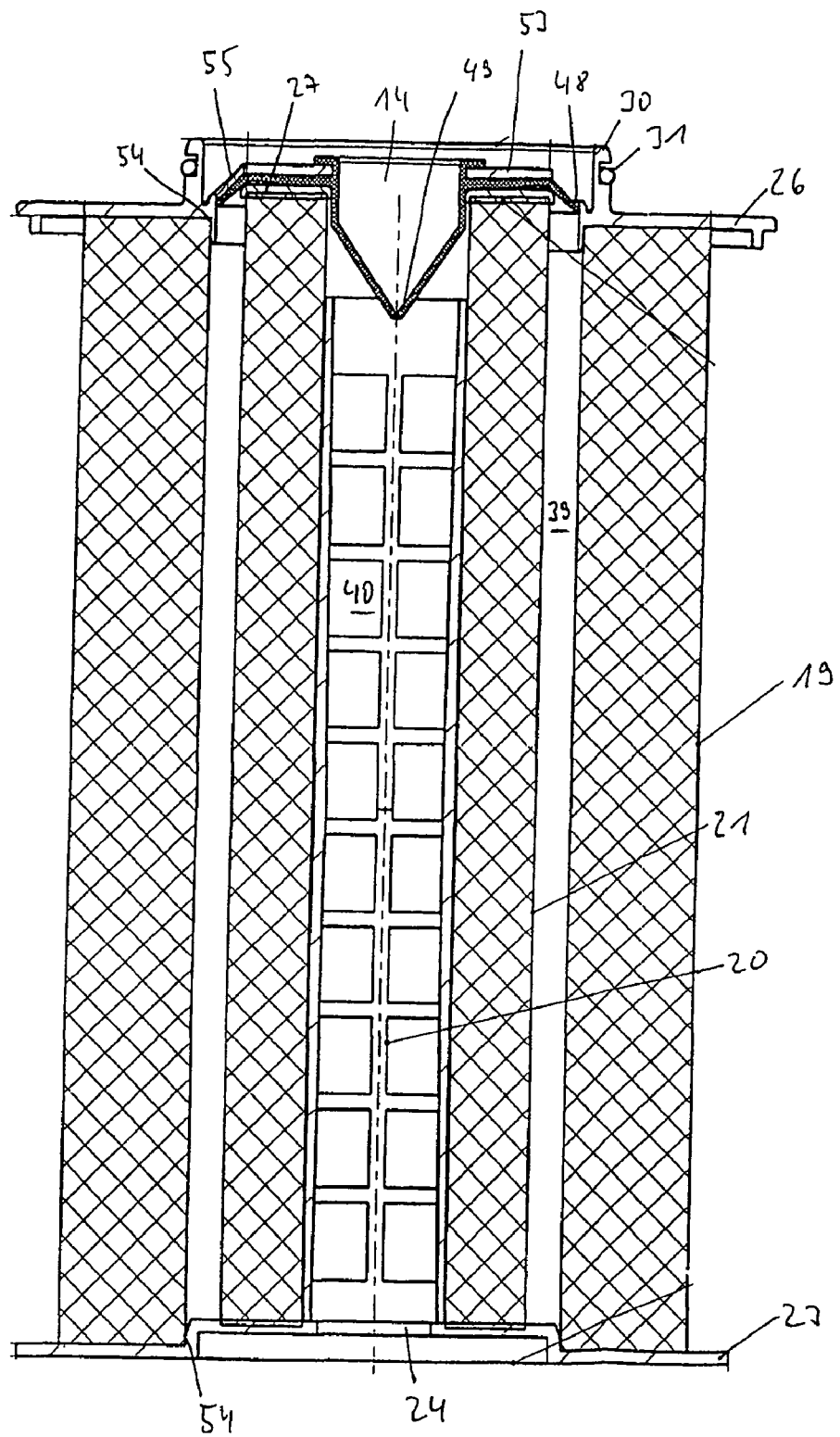
FIG. 9 is a sectional view through a part of an alternative filter element according to the invention.

FIG. 9 is a sectional view through a part of a filter element incorporating the alternative barrier membrane embodiment of FIG. 8. Again, components corresponding to those in the previous figures are identified by the same reference numerals. The inner filter bellows 21 is connected here to the lower end disk 23 and the upper end disk 27 by a butt welding method. The end closure disk 26 comprises a concentric mounting ring 53, and the barrier membrane 29 is secured in position by the mounting ring 53. Mounting ring 53 is preferably formed integrally with the end closure disk 26 via connecting webs 55 which are arranged around the periphery surrounding the outlet 14. End closure disk 26 and end disk 23 each have sealing seats 54 for the positioning and securing the outer filter bellows 19. The canister 16 (not shown here) may be similar in design to the previous description, thus connecting the two end disks 23 and 26.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A fluid filter system comprising
a cup-shaped housing connected to a receiving head by a releasable connection, and
a filter element arranged in the housing between a fluid inlet and a fluid outlet,
wherein a first connecting element of the releasable connection is provided on the receiving head,
a second connecting element of the releasable connection is arranged on a wall of the cup-shaped housing, a recess extends through the wall of the cup-shaped housing, the recess extending through a connecting contour of the second connecting element,
a part of the filter element engaging into the recess and extending through a wall of the cup-shaped housing completing the second connecting element into a continuous connecting element contour, the first and second connecting elements forming the releasable connection such that the connection between the housing and the receiving head can only be established when a filter element is properly installed in the housing.

2. A filter system according to claim 1, wherein the releasable connection is a bayonet connection.

3. A filter system according to claim 1, wherein the releasable connection is a clip connection.

4. A filter system according to claim 3, wherein
said clip connection comprises at least one catch member formed by the combination of the housing and the filter element such that a part of the housing and a part of the filter element engage at least partially one inside the other to form a continuous catch element contour.

5. A filter system according to claim 1, further comprising
a blocking element arranged in the connecting head such that the connection between the housing and the receiving head is prevented when no filter element or an incorrect filter element is installed in the housing, the blocking element engaging in the recess of the second connecting element of the cup-shaped housing preventing the bayonet connection from closing if the filter element is missing from the housing.

6. A connecting head for a filter system comprising
a cup-shaped housing connected to the connecting head by a releasable bayonet connection, and
a filter element arranged in the housing,
wherein said connecting head is provided with at least one connecting element for engaging a connecting element on the housing to form said releasable connection, and
said connecting element further comprises
    a blocking element arranged in the connecting head such that the connection between the housing and the receiving head is prevented when no filter element or an incorrect filter element is installed in the housing, the blocking element engaging into the recess of the second connecting element of the cup-shaped housing preventing the bayonet connection from closing if the filter element is missing from the housing.

7. A connecting head according to claim 6, wherein
said blocking element comprises
    a locking member movably mounted in the connecting head such that the locking member engages in a recess in a connecting element on the housing only when no filter element or an incorrect filter element is installed in the housing, the part of the filter element inserted into a corresponding recess in a wall of the cup-shaped housing preventing engagement of the locking member when the filter element is properly installed in the housing.

8. A connecting head according to claim 7, wherein
the locking member is displaced to a position which permits establishment of a releasable connection between the connecting head and a housing when the locking member is engaged by a connecting element formed by the combination of the housing and a filter element properly installed in the housing.

9. A housing for a filter system comprising
the housing connected to a connecting head by a releasable bayonet connection, and
a filter element arranged in the housing,
wherein the housing has an essentially cylindrical construction with one axial end being closed and the other axial end being open, and
at least one connecting element part for the releasable connection to the connecting head is arranged on the housing adjacent the open axial end, said at least one connecting element part comprising
    a recess in the connecting element part of the housing into which a connecting element part of the filter element inserts when the filter element is properly installed in said housing, completing a connecting contour of the housing connecting element part,
    whereby the connecting element part of the housing and the connecting element part of the filter element together form an operative connecting element for releasably connecting the housing to the connecting head.

10. A housing according to claim 9, wherein
the at least one connecting element part on the housing comprises a plurality of connecting element parts distributed around the circumference of the housing adjacent said open axial end, and
recesses are provided in the housing extending from the open end of the housing to the recesses in the connecting element parts.

11. A filter element for a filter system comprising a cup-shaped housing connected to the connecting head by a releasable connection and said filter element arranged in the housing,
wherein said filter element has an essentially cylindrical construction and carries a plurality of radially outwardly extending connecting element parts which mate with connecting element parts of the housing in which the filter element is installed,
wherein a recess is provided in the connecting element part of the housing into which the connecting element part of the filter element inserts when the filter element is properly installed in the housing,
wherein the connecting element part of the housing and the connecting element part of the filter element together form an operative connecting element for releasably connecting the housing to the connecting head.

12. A filter element according to claim 11, wherein
the radially outwardly extending connecting element parts of the filter element are matingly received in recesses formed in the connecting element parts of the housing.

* * * * *